US008600588B2

(12) United States Patent
Del Amo Blanco et al.

(10) Patent No.: US 8,600,588 B2
(45) Date of Patent: Dec. 3, 2013

(54) METEOROLOGICAL DATA SELECTION ALONG AN AIRCRAFT TRAJECTORY

(75) Inventors: Ana Isabel Del Amo Blanco, Ada, MI (US); Frank Saggio, III, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/174,848

(22) Filed: Jul. 1, 2011

(65) Prior Publication Data

US 2013/0006450 A1 Jan. 3, 2013

(51) Int. Cl.
*G06F 7/70* (2006.01)

(52) U.S. Cl.
USPC .......... 701/14

(58) Field of Classification Search
USPC .......... 701/3–18
See application file for complete search history.

(56) References Cited

U.S. PATENT DOCUMENTS 5,574,647 A 11/1996 Liden
5,999,882 A * 12/1999 Simpson et al. .......... 702/3
6,266,610 B1 7/2001 Schultz et al.
7,069,258 B1 6/2006 Bothwell
2005/0187677 A1* 8/2005 Walker .......... 701/16
2006/0155432 A1* 7/2006 Brown .......... 701/14
2008/0255714 A1 10/2008 Ross
2009/0037091 A1 2/2009 Bolt, Jr. et al.
2009/0204277 A1 8/2009 Coulmeau et al.
2010/0049382 A1* 2/2010 Akalinli et al. .......... 701/14
2010/0076629 A1 3/2010 Chaix et al.
2010/0152931 A1 6/2010 Lacombe et al.
2010/0198433 A1 8/2010 Fortier et al.
2011/0054718 A1 3/2011 Bailey

FOREIGN PATENT DOCUMENTS

EP 1 717 553 A2 2/2006
EP 2290636 A1 3/2011
EP 2490199 A2 8/2012

OTHER PUBLICATIONS

Search Report and Written Opinion from EP Application No. 12174127.6 dated Dec. 19, 2012.

* cited by examiner

*Primary Examiner* — John Q Nguyen
*Assistant Examiner* — Jordan S Fei
(74) *Attorney, Agent, or Firm* — McGarry Bair PC

(57) ABSTRACT

A method of selecting weather data for use in at least one of a flight management system (FMS) of an aircraft and a ground station includes selecting a reduced set of weather data points to send to the FMS and taking into account a trajectory of the aircraft when determining what data points to include in the reduced set.

22 Claims, 4 Drawing Sheets

METEOROLOGICAL DATA SELECTION ALONG AN AIRCRAFT TRAJECTORY

BACKGROUND OF THE INVENTION

In many commercial aircraft meteorological data at waypoints along an aircraft flight path may be considered for determining an estimated time of arrival and fuel burn during an aircraft's flight. For example, a flight management system (FMS) might consider wind direction, wind speed, and temperature data uploaded to the FMS from a ground station via a communications system while the aircraft is in flight or input by the pilot.

While the amount of the available meteorological data is large and may include multiple points along or near the aircraft flight path, there are practical limits to the real-time use of this large amount of data. For example, the FMS may be limited in the number of data points where weather data may be entered. Typically flight path data is provided to the FMS as the start point, the end point, and perhaps one or a few enroute waypoints. Such constraints in the data can limit the accuracy of FMS trajectory forecasts based on the data. Another practical limitation is the relatively high cost of transmitting the data to the aircraft, which is currently done by transmission over a subscription-based, proprietary communications system such as Airline Communications Addressing and Reporting System (ACARS).

BRIEF DESCRIPTION OF THE INVENTION

In one embodiment, a method of selecting weather data for use in at least one of a flight management system (FMS) of an aircraft and a ground station includes generating a reference aircraft trajectory using a reference data set comprising data points from a weather database, where the data points comprise a spatial position with associated weather data, generating an approximate aircraft trajectory using a reduced data set comprising fewer data points than the reference data set, comparing the reference aircraft trajectory to the approximate aircraft trajectory, determining at least one difference between the reference aircraft trajectory and the approximate aircraft trajectory based on the comparison, selecting a data point from the weather database corresponding to the determined at least one difference, and providing to the at least one of the FMS and the ground station the associated weather data of the selected data point.

In another embodiment, a method of selecting weather data for use in at least one of a flight management system (FMS) of an aircraft and a ground station includes generating a reference aircraft trajectory using a reference data set comprising data points from a weather database, where the data points comprise a spatial position with associated weather data, b) generating an approximate aircraft trajectory using a reduced data set comprising fewer data points than the reference data set, c) comparing the reference aircraft trajectory to the approximate aircraft trajectory, d) determining at least one difference between the reference aircraft trajectory and the approximate aircraft trajectory based on the comparison, e) selecting a data point from the weather database corresponding to the determined at least one difference, f) replacing a data point in the reduced data set with the selected data point, g) repeating steps b-f until the determined at least one difference satisfies a predetermined error threshold, and h) providing to the flight management system the weather data from at least some of the data points in the reduced data set.

DESCRIPTION OF EMBODIMENTS OF THE INVENTION

A flight path for an aircraft generally includes a climb, a cruise, and a descent. While described in the context of a full flight path from takeoff to landing, the invention is applicable to all or any portion of the full flight path, including in-flight updates to an original flight path. For purposes of this description, the full flight path example will be used.

Most contemporary aircraft include a flight management system (FMS) for generating a flight path trajectory 10 and flying the aircraft along the flight path trajectory 10. The FMS may automatically generate the flight path trajectory 10 for the aircraft based on commands, waypoint data, and additional information such as weather data all of which may be received directly from an Airline Operation Center (AOC) or from the pilot. Such information may be sent to the aircraft using a communication link. The communication link may be any variety of communication mechanism including but not limited to packet radio and satellite uplink. By way of non-limiting example the Aircraft Communications Addressing and Reporting System (ACARS) is a digital datalink system for transmitting messages between aircraft and ground stations via radio or satellite. The information may also be input by the pilot.

Figure 1:
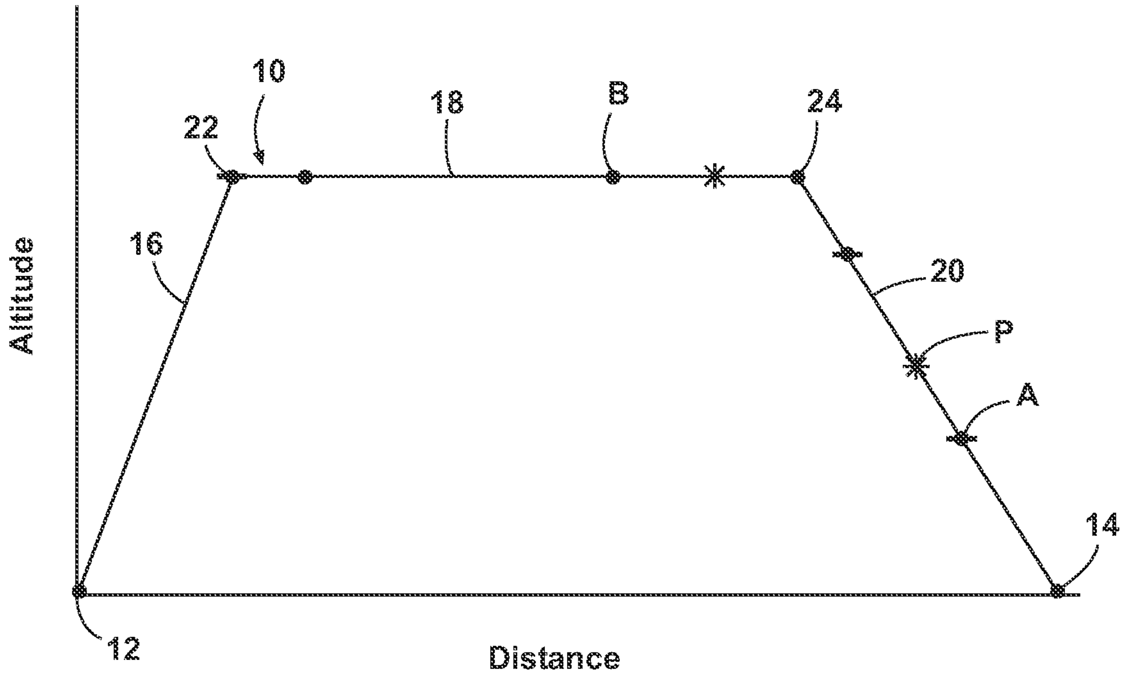
FIG. 1 is a schematic graphical illustration of an aircraft trajectory for implementing a flight path for an aircraft.

FIG. 1 is a schematic illustration of flight path for an aircraft in the form of an aircraft trajectory 10. The trajectory begins at a trajectory start point 12, such as the departure airport, and ends at a trajectory endpoint 14, such as a destination airport. Traversing between the start point 12 and end point 14 includes a climb phase 16, a cruise phase 18, and a descent phase 20, which are all included in the trajectory 10.

The climb, cruise and descent phases are normally input into a FMS as data points. For purposes of this description, the term data point may include any type of data point including waypoints, enroute waypoints, and altitudes and is not limited to a specific geographic position. For example, the data point may just be an altitude or it may be a specific geographic location, which may be represented by any coordinate system, such as longitude and latitude. By way of non-limiting example a data point may be 3-D or 4-D; a four dimensional description of the aircraft trajectory 10 defines where in 3D space the aircraft is at any given point of time. Each of the data points may include associated information, such as weather data that may include temperature data and wind data.

For the climb phase 16 a data point corresponding to the altitude A at the top of the climb 22 may be input; for the cruise phase 18 enroute waypoints B may be input; and for the descent phase 20 various altitudes may be input from the top of descent 24. After takeoff, an aircraft typically remains in the climb phase 16 up to the top of climb 22 and then it follows the enroute waypoints during the cruise phase 18 to the top of the descent 24 where it then starts the descent phase 20. The altitudes A in the climb phase 16 and the descent phase 20 are waypoints in the sense that the aircraft is achieving its trajectory 10 to such altitudes during these phases. The enroute waypoints B may be selected based upon the location of ground navigation aids (Navaids) along the trajectory 10 of the aircraft. It may be understood that during the cruise phase 18 there may be some changes in altitude especially for transcontinental flights where an aircraft may change it elevation to take advantage of or minimize the impact of prevailing winds, such as the jet stream, to climb to higher altitudes as fuel is burned, or to avoid turbulence.

Pseudo-waypoints P may also be included in the trajectory 10 and are artificial reference points created for some purpose relevant to a parameter of the trajectory 10 and are not limited to ground navigation aids. They can be defined prior to or after established data points for the trajectory have been set. Pseudo-waypoints can be defined in various ways, such as by latitude and longitude or by a specified distance along the current trajectory, such as an along-track waypoint.

The weather data may be entered for any of the data points. Such weather data improves the FMS flight predictions. The weather data may be obtained from a weather database which may contain real-time weather data or forecasted weather data. Such weather databases may contain information regarding certain weather-related phenomena (e.g., wind speed, wind direction, temperature, among others) and data pertaining to visibility (e.g., foggy, cloudy, etc.), precipitation (rain, hail, snow, freezing rain, etc.) and other meteorological information. Because air temperature, wind direction, and wind speed must be accounted for in trajectory calculations to ensure that the aircraft can accurately conform to the desired trajectory, the weather database may include 3-D real-time temperature and wind models of the local airspace as well as 4-D forecasted data. The weather database may store such real-time or forecasted weather data based at a specific latitude, longitude, and altitude.

While it is typically most accurate to use weather data from a data point from the weather database corresponding to the desired data point on the trajectory, not every latitude, longitude and altitude may be accounted for in the database and there may be a finer resolution of weather data for points over land in the United States and Europe, for example weather data every 2 km, and a reduced resolution for points over the Atlantic Ocean. Each data point of the weather database does not necessarily lie on the trajectory 10. When the weather database does not have a data point that corresponds to the data point on the trajectory, the available weather data may be interpolated to obtain weather data lying on the trajectory and the interpolated weather data may be entered into the FMS. Alternatively, the weather data from the closest weather data point for the data point on the trajectory may be entered into the FMS.

It is important to have accurate weather data because close representation of weather profiles in the vicinity of an aircraft's trajectory will produce more accurate FMS predictions, thereby resulting in improved estimations of aircraft fuel usage and arrival time. More up to date weather data used to prepare the weather profiles will typically result in a more accurate weather profile.

However, the ability to submit all relevant weather data from the weather database to the FMS from a ground station may be restricted by the FMS itself as the FMS typically limits the number of data points on the flight trajectory for which weather data may be entered and ultimately used in the trajectory prediction. For example, a FMS may allow weather data to be inserted only at en route waypoints and also a limited number of altitudes in climb and/or descent. In many FMS, the total number of permitted data points is less than 10 while the weather database may have hundreds of relevant data points for the trajectory. Thus, providing accurate weather data may be a challenge because the FMS has a limited number of data points it may receive.

Further, the timeliness of the weather data is limited because the communication link from the ground to the aircraft may have a limited bandwidth available for transmitting extensive weather data related to the flight trajectory of the aircraft, and, in any event, it may be costly to communicate large amounts of digital data to the aircraft. Most current systems are subscription-based, which have relatively high associated fees for data transmission. By way of non-limiting example, there is currently a charge per character or byte sent over ACARS. Therefore, the cost of communicating up-to-date weather data to the FMS is also a practical limitation. The lack of up-to-date weather data becomes more of an issue as the duration of the flight increases.

The most accurate trajectory prediction by the FMS would be one which used all of the weather data available along the flight path trajectory. However, the limit on data points that may be entered into the FMS, the cost of sending data real-time to the aircraft, and the lack of actual weather data along the flight plan place practical limitations on the accurate weather data being used in the FMS and the real-time updating of the weather data. The invention addresses the restrictions associated with these practical limitations by providing a reduced set of weather data points to the FMS that retain key weather attributes and thereby allow the FMS to improve its flight predictions based on such information.

An embodiment of the inventive method determines and sends to the FMS a reduced set of weather data points such that an approximated trajectory predicted by the FMS using the reduced set of weather data is a close approximation to a prediction of the same trajectory when all the available wind and temperature data relevant to the flight path trajectory are considered. More specifically, this embodiment may be generally described as predicting a reference trajectory from all of the relevant weather data points, predicting an approximated trajectory with a reduced set of weather data, identifying one or more locations of greatest difference between the reference trajectory and the approximate trajectory, and including in the reduced set the data point and its associated weather data from the weather database for the location of greatest difference, which may be done by adding to or replacing the waypoints in the reduced set. The term "approximate trajectory" in this context refers to the trajectory that is generated from a reduced set of weather data, which is to be distinguished from the reference trajectory which is generated from the full set of weather data available. In a specific and non-limiting example, the approximate trajectory means a trajectory calculated using the same mathematical model but with a reduced number of weather data points as compared to the reference trajectory which is generated from a full set of available weather data points.

Figure 2:
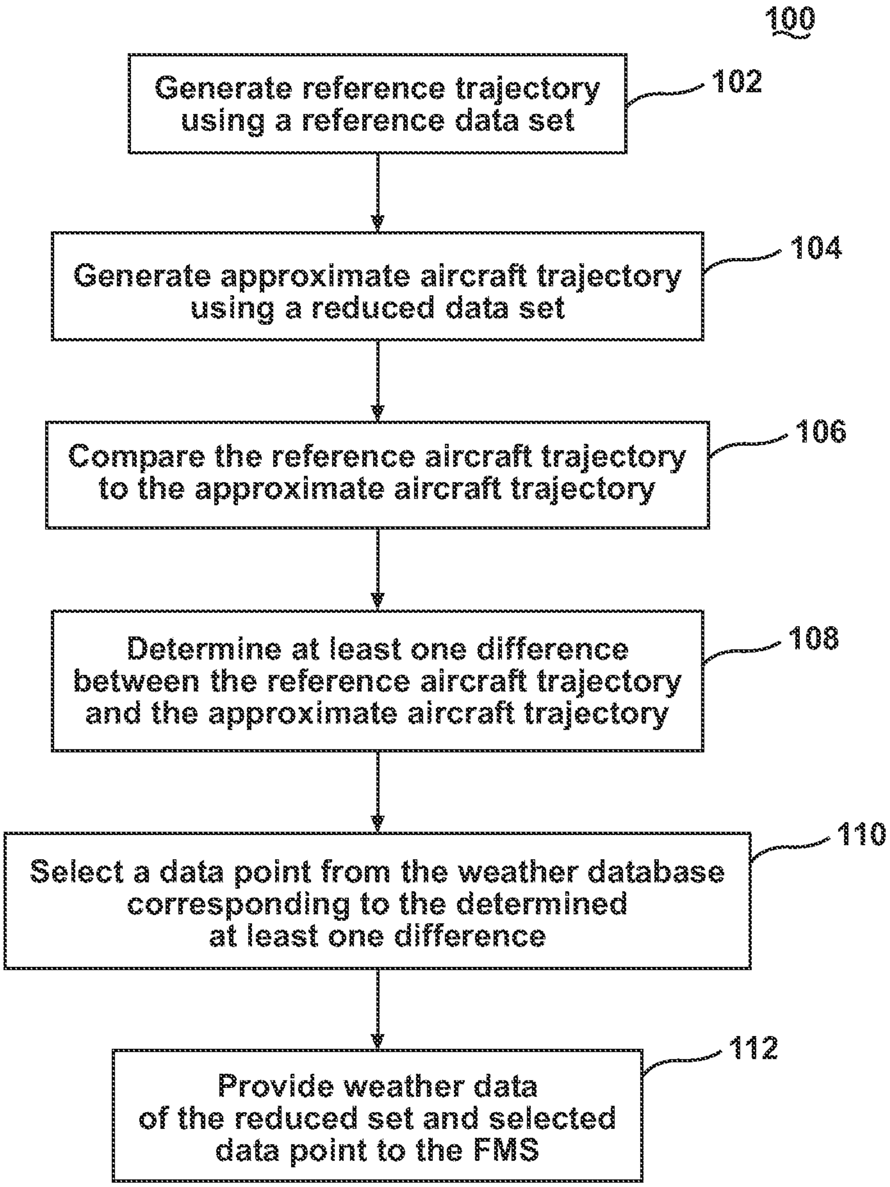
FIG. 2 is a flow chart of a method according to a first embodiment of the invention.

In accordance with this embodiment of the invention, FIG. 2 illustrates a method 100 of providing a reduced set of weather data points for an aircraft trajectory to the FMS. The sequence of steps depicted is for illustrative purposes only, and is not meant to limit the method 100 in any way as it is understood that the steps may proceed in a different logical order or additional or intervening steps may be included without detracting from the invention. It is contemplated that such method 100 may be carried out in a system on the ground and that the relevant output may be sent to the FMS of the aircraft via a communication link.

The method 100 may begin with generating a reference trajectory using a reference data set at 102. The reference aircraft trajectory may be generated using a full reference data set that includes all available data points from a weather database along the trajectory. It will be understood that the method 100 may work for a trajectory that includes an entire trajectory of the aircraft or a trajectory that comprises any one of a climb phase 16, a cruise phase 18, and a descent phase 20.

The reference trajectory may be generated at 102 by a separate ground-based trajectory prediction system which may take into account all of the available weather data along the trajectory as well as aircraft performance data, and a navigation database. At the very least this prediction system may generate a reference trajectory taking into account more weather data than an FMS would be able to use, that is the data points used to generate the reference trajectory will include more points than the enroute waypoints and/or altitudes. The system will obtain weather data along the trajectory from the weather database, which may be located on a weather server accessible through a weather database if it is part of the system, or from a weather provider for a 3 or 4 dimensional weather update along the trajectory. The weather data point may be considered to be along the trajectory if the weather data point is within a predetermined geographical distance from the trajectory. By way of non-limiting example, the weather data points extracted for a specific trajectory may be within 2-5 kilometers of the location of the trajectory. Weather data points on the trajectory may also be interpolated from other weather data points lying off the trajectory. The weather data points may include a spatial position with associated weather data. The weather data may include at least one of: wind speed, wind direction, air temperature, humidity, and barometric pressure data elements.

The aircraft performance data may include the flight envelope of the aircraft model (maximum speed, minimum speed, etc.), engine thrust, fuel consumption, etc. The reference trajectory may be a 4D or a 3D trajectory and may represent a trajectory of the actual flight path the aircraft will fly using all available data points from the weather database to determine the likely path of the aircraft under the expected weather conditions. While this method provides the most accurate prediction of the actual flight, it can't be used in the FMS because it contains too many data points for the corresponding phase of the flight that can be entered into the FMS. Any type of curve fitting can be used to model the reference trajectory.

At 104 an approximate trajectory based on a reduced number of weather data points is generated. The number of data points may be equal to or less than the number of data points that can be entered into the FMS and may include at least some of the data points in the reference data set. Such an approximated trajectory may not be as accurate as the reference trajectory, which uses the full amount of weather data available.

At 106 the full reference trajectory and the approximate trajectory are compared with each other. Such comparisons may occur on a flight phase basis or an entire trajectory basis. At 108 the comparison is analyzed and at least one difference between the reference trajectory and the approximate trajectory is determined. Multiple differences may be determined at 108. More specifically, it may be determined at 108 which points along the trajectory have the greatest differences. By way of non-limiting example, in the cruise phase 18 a difference to measure may be time, since the reference and approximated trajectories go through similar waypoints. Distance may be another difference to measure since the aircraft will try to follow the same path in any case. By way of additional non-limiting example, in descent the variable to consider may be the ground distance at altitude or time since both trajectories are designed to end up in the same place and time.

An alternative to the method is that steps 104-106 may be repeated to find the reduced set that results in the approximate trajectory with the fewest differences from the reference trajectory. The repeating of steps 104-106 may be exhaustive in that all possible combinations of data points for the reduced data set are considered. Alternatively, the repeating of steps 104-106 may be repeated until one of the approximate trajectories satisfies an exit criteria.

At 110 a data point corresponding to the determined at least one difference may be selected from the weather database and this weather data is then used in the reduced data set to improve the accuracy of the resulting prediction with the premise being that providing up-to-date weather data in the reduced set at locations of greatest difference from the reference trajectory will eliminate the sources of greatest possible error for the reduced data set. The weather data for the selected data point may be introduced into the reduced data set in different ways. The selected data point, which may be used to create a pseudo waypoint may be created on the trajectory at the point where there is the largest difference between the reference trajectory generated at 102 and the approximated trajectory generated at 104. If the maximum difference occurs in an existing waypoint the system may select the next location where the difference is greatest until the location is not an existing waypoint or it may use the existing waypoints if it is the point with the largest difference. The inventive method may include providing interpolated weather forecast data for the pseudo waypoint, which may be derived from the weather forecast data points around the pseudo-point. Alternatively, actual weather forecast data may be used for such pseudo-points.

Constraints such as a minimum distance from any other point in the set may be considered; thus, it may be determined if the proposed pseudo waypoint is valid. If it is not, the method 100 may select the next greatest difference and repeat the process. Further, heuristic rules such as weighting or prioritization of certain locations or location types may be used. It is also contemplated that the method allows for user constraints, such as maximum number or locations of weather entries in any particular phase of the trajectory 10 or the trajectory 10 as a whole.

Determining a difference may include determining the points on the trajectories where the difference exceeds a difference threshold. In such a case if the difference does not exceed a difference threshold than the difference may be ignored and a point will not be selected for such a difference. It is also contemplated that determining at least one difference may include determining multiple differences and the selecting a data point comprises selecting a data point for each of the multiple differences.

At 112 the weather data for the reduced data set, used to generate the approximate aircraft trajectory, along with the selected data point corresponding to the determined difference may be output to the FMS. The output may include reduced sets and additional weather data points for each phase of the flight being output to the FMS. The information may be wirelessly transmitted from the ground station to the FMS on board the aircraft via a communication link. The reduced data set and selected data point(s) may be transmitted to the aircraft while it is in flight or on the ground. Such a reduced data set and selected data point(s) along with their corresponding weather data will allow the FMS to predict a more accurate trajectory. Thus, the data sent to the FMS may best allow the FMS to create a more accurate trajectory based on reduced weather data for weather that will be encountered during the flight of the aircraft. It is also contemplated that the reduced data set along with the selected data point(s) may be sent to the pilot, to another ground station or another system.

Figure 3:
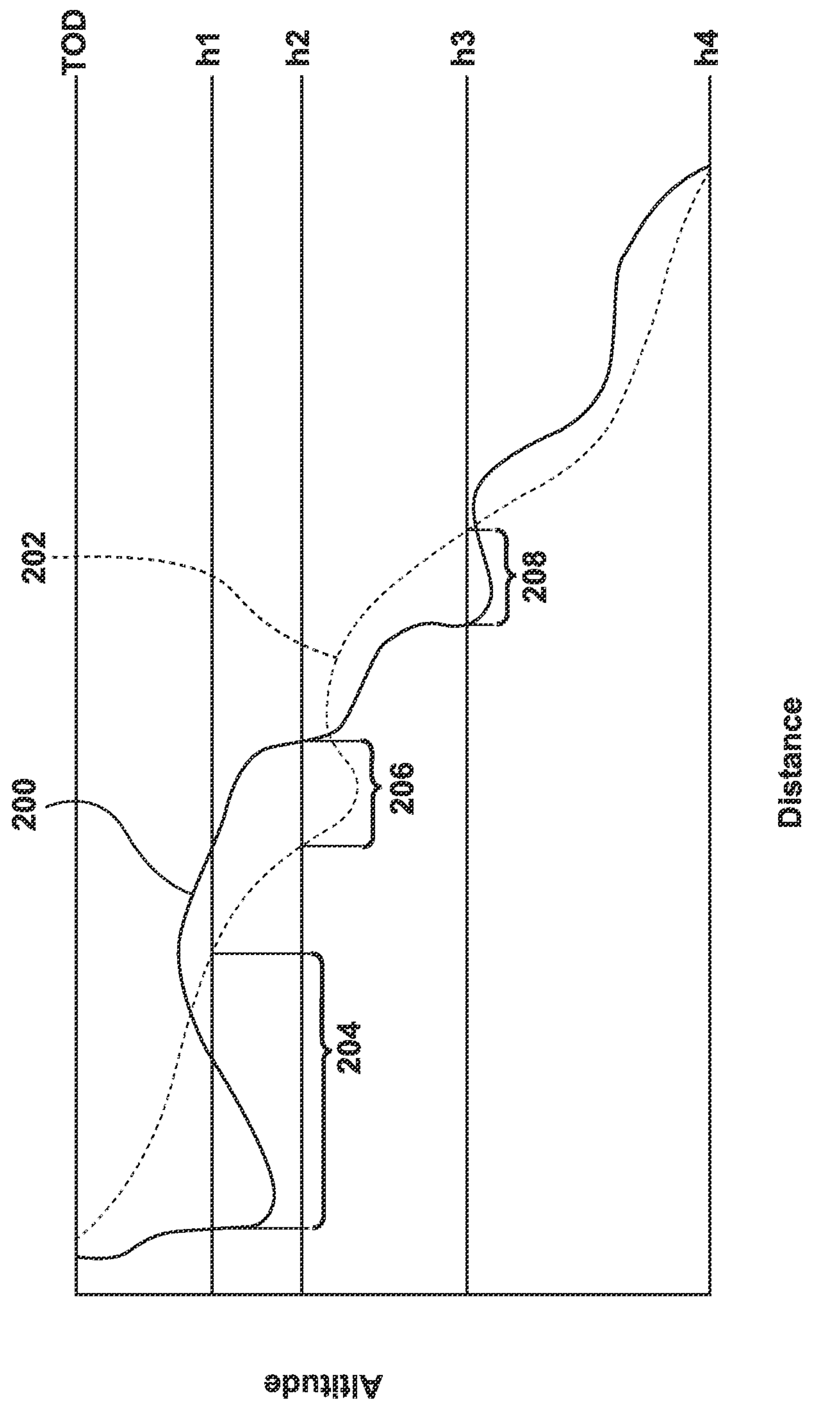
FIG. 3 is a graphical illustration of an example of determining a difference between trajectories according to the flow chart in FIG. 2.

FIG. 3 graphically illustrates an example of determining differences between a reference aircraft trajectory 200 and an approximate aircraft trajectory 202, which are shown for the descent phase 20. In a specific example, it is contemplated that the reference aircraft trajectory 200 and an approximate aircraft trajectory 202 may be based on weather data as well as aircraft performance data, and a navigation database. As may be seen, when the reference aircraft trajectory 200 and the approximate aircraft trajectory 202 are compared there may be several differences between the two. The altitudes at which the difference between the reference aircraft trajectory 200 and the approximate aircraft trajectory 202 are the greatest have been noted as h1 where the designated difference is labeled 204, h2 where the designated difference is labeled at 206, and h3 where the designated difference is labeled as 208. The weather data at these points may be selected as the selected data point to be included in the information to be sent to the FMS. It is contemplated that the largest difference 204 may be the data point that is selected first and its associated weather data corresponding to that altitude will be included with the reduced data set. If the FMS will allow additional data points the data points at 206 and 208 may also be selected and sent to the FMS. By way of non-limiting example, it is contemplated that the reduced data set and selected data points may be selected by comparing a cost function between unique sets that balances user defined constraints of fuel usage and time. The performance of the reduced data set and the reduced set with the selected points may be compared and if the performance has improved the selected points may be sent to the FMS and if not a new selection may be done.

It is contemplated that after updating the reduced data set with the weather data for the greatest difference(s), the method 100 may generate an updated approximate aircraft trajectory based on the updated reduced data set and the selected data point corresponding to the difference. The method may then determine another at least one difference between the reference trajectory and the updated approximate trajectory and select a data point from the weather database corresponding to the another at least one difference and that this data point may be included in the data provided to the FMS. The method may keep updating the approximate aircraft trajectory and determining a difference between the reference trajectory and the updated approximate trajectory and selecting a data point corresponding to the difference until the error between the reference trajectory and the updated approximate trajectory is within some predetermined threshold or an exit criterion has been met. In this manner the method may step along the set of points where there is a difference between the reference and the approximated trajectory starting with the location along the trajectory where the maximum difference occurs until all the points where there is an error have been examined.

The total number of data points including the selected data points cannot exceed the total data points that may be entered into the FMS. The selected data points added to the set may be chosen based on the output of a cost function that balances user defined constraints of fuel usage and time. The cost function is used to select the number of points to be entered in the FMS. By way of non-limiting example, every time a recalculation of the approximate aircraft trajectory 202 is done with an additional data point, a cost function defined by the user may be evaluated and the data point will be added if the value of the cost function has improved and the difference between the approximate aircraft trajectory 202 including the pseudo waypoint and the reference aircraft trajectory 200 is less or equal to the difference between the reference aircraft trajectory 200 and the approximate aircraft trajectory 202 without the addition of the pseudo waypoint. Otherwise, the point will be discarded.

Alternatively, it is contemplated that variations of the data set and selected points may be run and the one with the least errors may be sent to the FMS. By way of non-limiting example, if the number of points selected is more than the number of points that the FMS can accept, a performance comparison of the possible combinations of points may be performed. The combination that provides the optimum cost function value, among them, will represent the set of weather data points to be sent to the aircraft or requesting system.

Such reduced data set and selected points sent to the FMS, get closer to the reference trajectory given the limitation of the data points that can be entered into the FMS. Thus, the reduced set and selected points will cause the aircraft to fly closest to the reference trajectory even if the data points are not associated with data points on the official trajectory.

Figure 4:
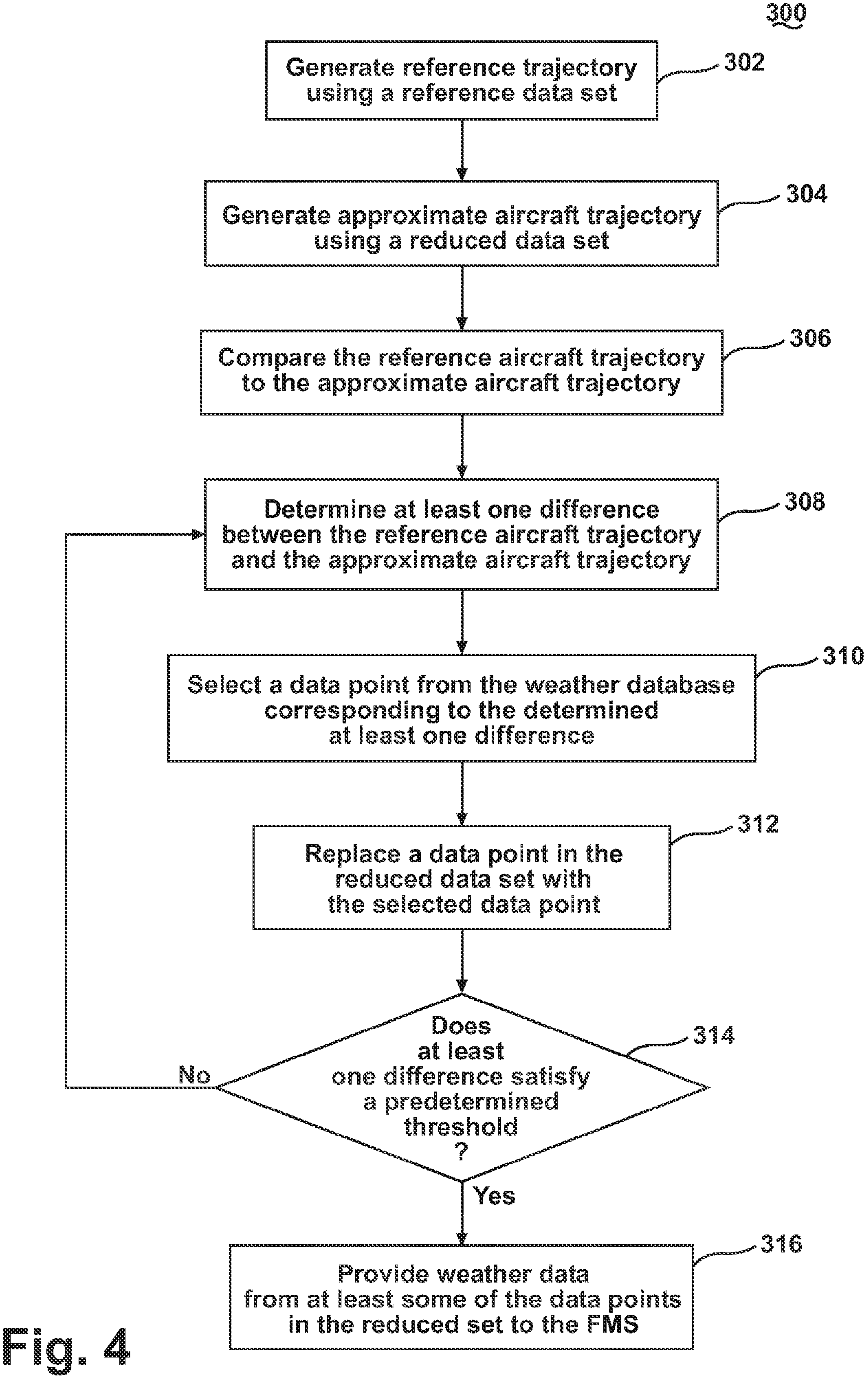
FIG. 4 is a flow chart of a method according to a second embodiment of the invention.

FIG. 4 is a flow chart of a method 300 according to a second embodiment of the invention. The second embodiment 300 is similar to the first embodiment 100. Therefore, like steps will be identified with like numerals increased by 200, with it being understood that the description of the like steps of the first embodiment applies to the second embodiment, unless otherwise noted.

One difference between the first embodiment 100 and the second embodiment 300 is that the data point selected, which corresponds to the at least one difference between the reference trajectory and the approximate trajectory, replaces a data point in the reduced data set at 312. Then at 314 it is determined if the at least one difference satisfies a predetermined threshold. The predetermined threshold may be a predetermined value selected to minimize error in at least one of a predicted time of arrival and a fuel burn; in this manner, the predetermined threshold may be considered a predetermined error threshold. The term “satisfies” the threshold is used herein to mean that the difference satisfies the predetermined threshold, such as being equal to or less than the threshold value. It will be understood that such a determination may easily be altered to be satisfied by a positive/negative comparison or a true/false comparison. The threshold may be experimentally determined and it is contemplated that a user may fine tune the predetermined threshold for the approximated profile to suit their needs.

If the at least one difference is included in the recalculation of the flight path trajectory, and does not satisfy the threshold value, then the method 300 returns to 308 where another difference is determined between the trajectories, a data point is selected that corresponds to the another difference at 310, the selected data point replaces a data point in the reduced set at 312, and it is determined again if the another difference satisfies the predetermined threshold. These steps are repeated until the difference satisfies the threshold. Once the difference does satisfy the threshold, weather data from at least some of the data points in the reduced set are sent to the FMS at 316.

It is contemplated that because the method 300 is working within the reduced set that the determining a difference and selecting a point for that difference may only be done if the flight path trajectory predictions obtained using the weather data at the data point where the difference was found, exceeds a difference threshold. As with the method 100 described above the method 300 may include finding the data set with the lowest error and may include a performance comparison of the possible combination of data points wherein the combination that provides the optimum cost function value, among them, will represent the set of weather data points to be sent to the FMS.

Further, the method 300 may include comparing the last determined at least one difference to a previous determined at least one difference to determine if there is an improvement between the last determined at least one difference and the previous determined at least one difference. In such cases the at least one difference may satisfy the predetermined error threshold when the improvement satisfies a predetermined improvement value.

By way of non-limiting example, the method 300 may be particularly useful during the descent phase 20 where data for only a specific number of altitudes may be entered into the FMS. It will be understood that depending on the number of points in the reduced data set and the number of points acceptable by the FMS additional pseudo waypoints may also be added. The addition of weather data points may be limited by user defined criteria relating to the number of data points that the FMS may accept. In this manner, the error reduction between the reference trajectory and the approximated trajectory may include sequentially adding to the number of data points until the total number of data points that can be entered into the FMS is reached, altering the weather data at data points within the trajectory or both. Such combinations may be made until the error between the reference aircraft trajectory 200 and the approximate aircraft trajectory 202 model is less than a defined threshold or until the improvement between the last approximate aircraft trajectory 202 and the previous approximate aircraft trajectory 202 output is less than a predetermine value.

The above method may take into account various user constraints and will optimize the reduced data set for a given set of user constraints. It is contemplated that a data point threshold may be set that defines the maximum number of data points that can be sent to the FMS. Such threshold may be a system limited threshold or may be a user defined threshold. By way of non-limiting example, a FMS system may have a predetermined data point threshold of five weather data points; thus, a data point threshold may be set by the system to limit the amount of data points in the reduced data set. A user may set a limit less than the amount of data points the FMS may accept for cost reasons.

The above described methods process large-scale weather data and compute reduced data to be provided to the FMS. The invention takes into account that many FMSs have limited memory available to store this data and can receive only a limited number of elements for use in the trajectory prediction. The reduced data points are chosen to minimize error when compared with a reference trajectory. Such reduced data enters the most influential weather data such that the FMS will have a more accurate prediction and will thereby result in improved estimations of aircraft fuel usage and arrival time. Further, the invention includes very little iteration and each iteration is a self-contained optimization step.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of selecting weather data for use in at least one of a flight management system (FMS) of an aircraft and a ground station comprising:

generating a reference aircraft trajectory using a reference data set comprising data points from a weather database along the trajectory, where the data points comprise a spatial position with associated weather data;

generating an approximate aircraft trajectory using a reduced data set comprising fewer data points than the reference data set;

comparing the reference aircraft trajectory to the approximate aircraft trajectory;

determining at least one difference between the reference aircraft trajectory and the approximate aircraft trajectory based on the comparison;

selecting a data point from the weather database corresponding to the determined at least one difference where the selected data point is not in the reduced data set, adding the selected data point to the reduced data set; and providing to the at least one of the FMS and the ground station the associated weather data of the selected data point.

2. The method of claim 1 wherein the reduced data set comprises a number of data points not greater than a number of data points that can be inputted into the at least one of the FMS and the ground station.

3. The method of claim 1 wherein the reduced data set comprises at least some of the data points in the reference data set.

4. The method of claim 1 wherein the determining at least one difference comprises determining multiple differences and the selecting a data point comprises selecting a data point for each of the multiple differences.

5. The method of claim 1 wherein the providing to the at least one of the FMS and the ground station the associated weather data of the selected data point comprises providing the selected data point as at least one of an enroute waypoint, pseudo waypoint or altitude to the at least one of the FMS and the ground station.

6. The method of claim 1 wherein the reference aircraft trajectory comprises at least one of a climb phase, a cruise phase, and a descent phase.

7. The method of claim 1 wherein the determining at least one difference comprises determining the points on the reference aircraft trajectory and the approximate aircraft trajectory where the difference exceeds a difference threshold.

8. A method of selecting weather data for use in at least one of a flight management system (FMS) of an aircraft and a ground station comprising:

a) generating a reference aircraft trajectory using a reference data set comprising data points from a weather database along the trajectory, where the data points comprise a spatial position with associated weather data;

b) generating an approximate aircraft trajectory using a reduced data set comprising fewer data points than the reference data set;

c) comparing the reference aircraft trajectory to the approximate aircraft trajectory;

d) determining at least one difference between the reference aircraft trajectory and the approximate aircraft trajectory based on the comparison;

e) selecting a data point from the weather database corresponding to the determined at least one difference where the selected data point is not in the reduced data set;

f) replacing a data point in the reduced data set with the selected data point;

g) repeating steps b-f until the determined at least one difference satisfies a predetermined error threshold; and h) providing to the flight management system the weather data from at least some of the data points in the reduced data set.

9. The method of claim 8 wherein the reduced data set comprises a number of data points not greater than a number of data points that can be inputted into the at least one of the FMS and the ground station.

10. The method of claim 8 wherein the reduced data set comprises at least some of the data points in the reference data set.

11. The method of claim 8 wherein the determining at least one difference comprises determining multiple differences and the selecting a data point comprises selecting a data point for each of the multiple differences.

12. The method of claim 8 wherein the providing to the at least one of the FMS and the ground station the associated weather data of the selected data point comprises providing the selected data point as at least one of an enroute waypoint, pseudo waypoint or altitude to the at least one of the FMS and the ground station.

13. The method of claim 8 wherein the reference aircraft trajectory comprises at least one of a climb phase, a cruise phase, and a descent phase.

14. The method of claim 8 wherein the determining at least one difference comprises determining the points on the reference aircraft trajectory and the approximate aircraft trajectory where the difference exceeds a difference threshold.

15. The method of claim 8 wherein the satisfying the predetermined threshold comprises the at least one difference being less than a predetermined amount.

16. The method of claim 8 wherein the satisfying the predetermined threshold comprises finding the data set with the lowest error.

17. The method of claim 8 wherein the predetermined error threshold is a predetermined value selected to minimize error in at least one of a predicted time of arrival and a fuel burn.

18. The method of claim 8, further comprising comparing a last determined at least one difference to a previous determined at least one difference.

19. The method of claim 18 wherein the comparing comprises determining an improvement between the last determined at least one difference and the previous determined at least one difference.

20. The method of claim 19 wherein the at least one difference satisfies the predetermined error threshold when the improvement satisfies a predetermine improvement value.

21. The method of claim 8, further comprising comparing a cost function between the reduced data set and the reduced data set with the replaced data point.

22. The method of claim 21 wherein the comparing comprises determining an improvement between the reduced data set and the reduced data set with the replaced data point.

* * * * *